(12) United States Patent
Katzer et al.

(10) Patent No.: US 7,613,805 B1
(45) Date of Patent: Nov. 3, 2009

(54) DATA STORE WRAPPER ENHANCEMENTS

(75) Inventors: Robin D. Katzer, Olathe, KS (US); Carl J. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1008 days.

(21) Appl. No.: 10/886,173

(22) Filed: Jul. 7, 2004

(51) Int. Cl.
G06F 15/16 (2006.01)
G06F 15/173 (2006.01)
G06F 9/46 (2006.01)

(52) U.S. Cl. .................. 709/224; 709/217; 718/105

(58) Field of Classification Search ............... 709/217, 709/224; 718/105
See application file for complete search history.

(56) References Cited

U.S. PATENT DOCUMENTS

| | | | | |
|---|---|---|---|---|
| 6,289,382 B1 * | 9/2001 | Bowman-Amuah | ......... | 709/226 |
| 6,381,735 B1 * | 4/2002 | Hunt | ........................... | 717/158 |
| 6,684,121 B1 * | 1/2004 | Lu et al. | ..................... | 700/108 |
| 7,127,713 B2 * | 10/2006 | Davis et al. | ................. | 717/177 |
| 2003/0208505 A1 * | 11/2003 | Mullins et al. | .............. | 707/102 |
| 2004/0168173 A1 * | 8/2004 | Cohen et al. | ................ | 719/310 |

\* cited by examiner

*Primary Examiner*—William C Vaughn, Jr.
*Assistant Examiner*—Ranodhi N Serrao

(57) ABSTRACT

A data store wrapper system is provided that includes a plurality of data store wrappers each in communication with one or more data stores. The system includes a load balance component in communication with the plurality of data store wrappers to load balance data service requests between the plurality of data store wrappers. An adapter is provided that communicates requests for data service to one or more of the plurality of data store wrappers. The system also includes an application programming interface in communication with client applications, which request the data services, and the load balance component. The application programming interface is operable to receive the requests for data services from the client applications and direct the requests for data services to the data store wrapper.

7 Claims, 3 Drawing Sheets

DATA STORE WRAPPER ENHANCEMENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software for accessing data store systems, and more particularly, but not by way of limitation, to a system for improving data store wrapper applications.

BACKGROUND OF THE INVENTION

Enterprises may maintain data on several disparate data store systems. Enterprises typically have numerous computer programs or applications that are employed in various capacities to operate and manage the enterprise, and these applications often interact with the data store systems. Each data store system may have interface requirements which are incompatible with the other data store systems.

Several software vendors have developed products which may be said to provide a wrapper for multiple disparate data store systems and provide a common interface to applications. Once such product is Attunity Connect, provided by Attunity, Inc. of Wakefield, Mass. (www.attunity.com). Thus, an application may employ the same interface operation for accessing information independently of the data store system in which the information may be stored. The data store wrapper product performs the functionality of mapping an interface operation to the specific interface operation needed to access the subject data store system.

SUMMARY OF THE INVENTION

According to one embodiment, a data store wrapper system is provided that includes a plurality of data store wrappers each in communication with one or more data stores. The system includes a load balance component in communication with the plurality of data store wrappers to load balance data service requests between the plurality of data store wrappers. An adapter is provided that communicates requests for data service to one or more of the plurality of data store wrappers. The system also includes an application programming interface in communication with client applications, which request the data services, and the load balance component. The application programming interface is operable to receive the requests for data services from the client applications and direct the requests for data services to the data store wrapper.

According to another embodiment, a data store wrapper system is provided. The system includes a plurality of data store wrappers. Each of the data store wrapper includes a plurality of adapters to send a requests for data services to a data store and data store wrappers associated with other data stores. The plurality of adapters also receives a data services response. The plurality of data store wrappers each also include an application programming interface to communicate with a client application regarding requests for data services. The application programming interface directs the request for data store services to one of the adapters and returns the data store services response to the client application. The system also includes a load balancer that includes a load balance component operable to identify one of the plurality of data store wrappers to which to send the requests for data services. The load balance component also includes load balance adapters and a load balance application programming interface. The load balance adapters communicate with one or more of the plurality of the data store wrappers regarding requests for data services. The load balance application programming interface is in communication with the load balance component and is operable to receive the request for data services from one or more client applications. The application programming interface also communicates with one or more of the plurality of data store wrappers regarding requests for data services from the one or more client applications. The system also includes a monitor to analyze the state of processing of the data store wrappers and the load balancer and to report a state of processing to a data store wrapper monitor client.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Data store wrapper products may have limited functionality. In a large enterprise, several data store wrapper servers may be deployed to handle the large volume of accesses to the data store. It is desirable that the data store wrapper provide auxiliary functionality to support efficient management and control of the data store wrapper in a large enterprise.

Figure 1:
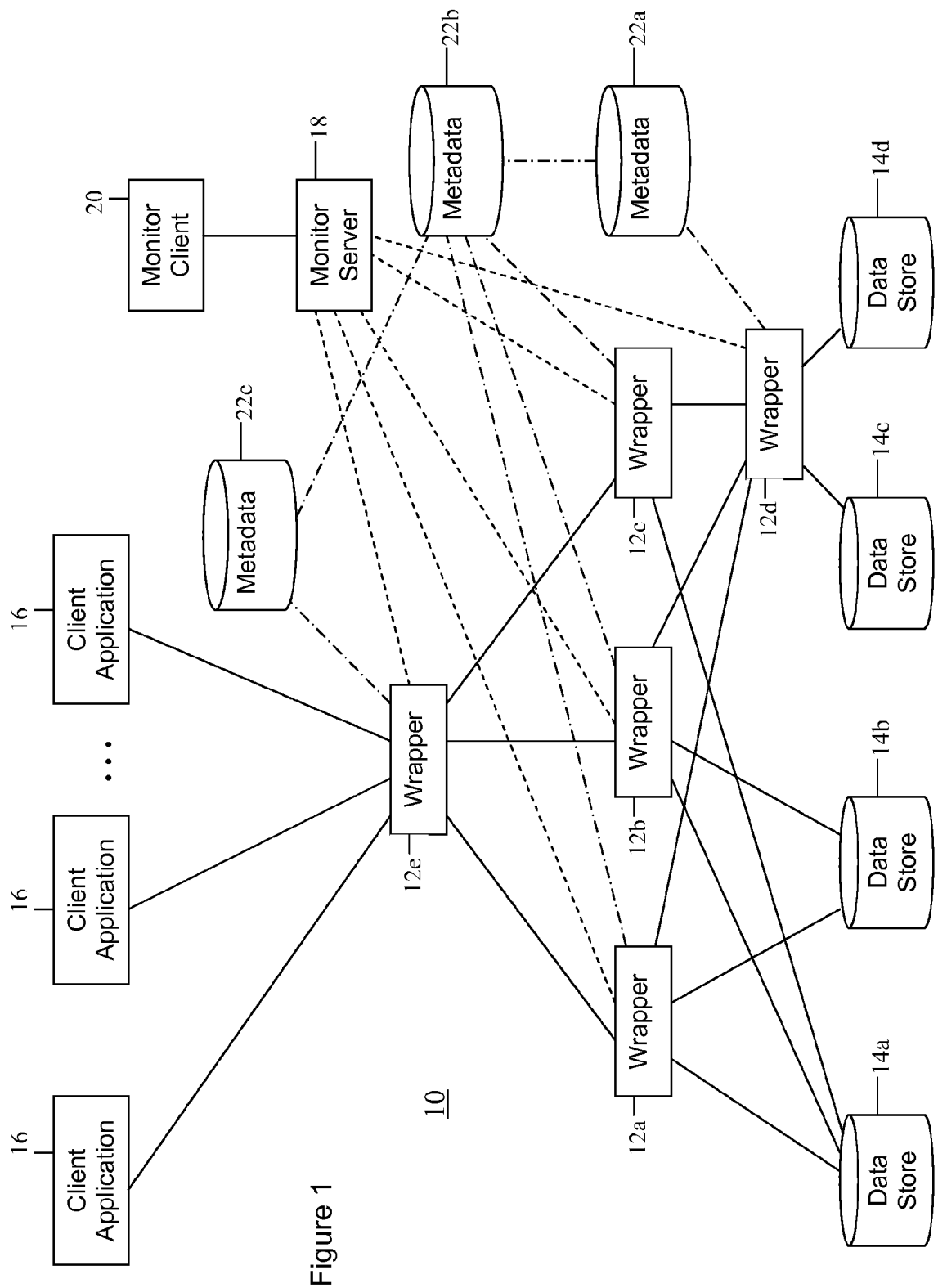
FIG. 1 is a block diagram of a system of a data store system according to an embodiment.

Turning now to FIG. 1, a block diagram depicts a data store system 10 that employs a plurality of data store wrappers 12 to access the data stores 14. The data store wrappers 12 are software components or applications and may be termed proxies because they stand in the place of the access point or interface to the data stores 14. The data store wrappers 12 may execute on a general purpose computer system. General purpose computer systems are discussed in greater detail hereinafter. The general purpose computers on which the data store wrappers 12 may execute may be called servers.

In some cases, the data store wrappers 12 may share access to the data stores 14—for example, a first data store wrapper 12a, a second data store wrapper 12b, and a third data store wrapper 12c may each be able to access a first data store 14a and a second data store 14b. In other cases, a data store wrapper 12—for example a fourth data store wrapper 12d—may be installed on the same computer system as the data store 14 for example a third data store 14c and a fourth data store 14d and all accesses to the third data store 14c and the fourth data store 14d may be mediated by the fourth data store wrapper 12d. A data store wrapper 12 may send a data store service request to another data store wrapper 12, for example the third data store wrapper 12c may send the data store service request to the fourth data store wrapper 12d.

In an embodiment, one of the data store wrappers 12—for example a fifth data store wrapper 12e—provides a load balancing functionality. In this case, the data store service requests from a plurality of client applications 16 are directed to the fifth data store wrapper 12e, and the data store wrapper 12e provides the load balancing functionality by forwarding the data store service requests to the data store wrappers 12a, 12b, 12c so as to distribute the load among the data store wrappers 12a, 12b, and 12c.

A monitor server 18 is in communication with the data store wrappers 12 to monitor and analyze processing of the data store service requests. The monitor server 18 responds to requests for data store service processing status received from a monitor client 20. In an embodiment, the monitor server 18 may provide processing status and processing load information to the fifth data store wrapper 12e for use in performing load balancing activities. For example, the fifth data store wrapper 12e may not forward requests to the second data store wrapper 14b if the monitor server 18 indicates that the second data store wrapper 14b is stalled. Also, the fifth data store wrapper 12e may use the processing load information from the monitor server 18 to intelligently allocate data store service requests to the data store wrappers 12.

Metadata repositories 22a, 22b, and 22c, collectively referred to as metadata repositories 22, contain information about the data stores 14 and about the views of the data stores 14 as seen from the several layers of data store wrappers 12. Metadata may include table names, column names, identification of primary keys, identification of foreign keys, identification of data types of columns, identification of data sizes of columns, server configurations, virtual database information, and other information.

The metadata repositories 22 may be implemented as relational databases, for example as an Oracle relational database. The metadata repositories 22 have a hierarchical relationship with each other. A first metadata repository 22a stores metadata related to the third data store wrapper 12d, the third data store 14c, and the fourth data store 14d. A second metadata repository 22b stores metadata related to the first data store wrapper 12a, the second data store wrapper 12b, the third data store wrapper 12c, the first data store 14a, and the second data store 14b.

The second metadata repository 22b also contains links to the metadata contained in the first metadata repository 22a, whereby the second metadata repository may be said to shadow the metadata stored in the first metadata repository 22a. A request sent to the second metadata repository 22b for all metadata will return data contained by the second metadata repository 22b as well as all metadata shadowed by the second metadata repository 22b. While the metadata stored in the first metadata repository is not duplicated in the second metadata repository 22b, queries to the second metadata repository 22b look-up the appropriate metadata information from the first metadata repository 22a and include this in the response. The metadata repositories 22 may have a wrapper application, not shown, which wraps the metadata in the metadata repositories 22 and provides the shadowing functionality.

Figure 2:
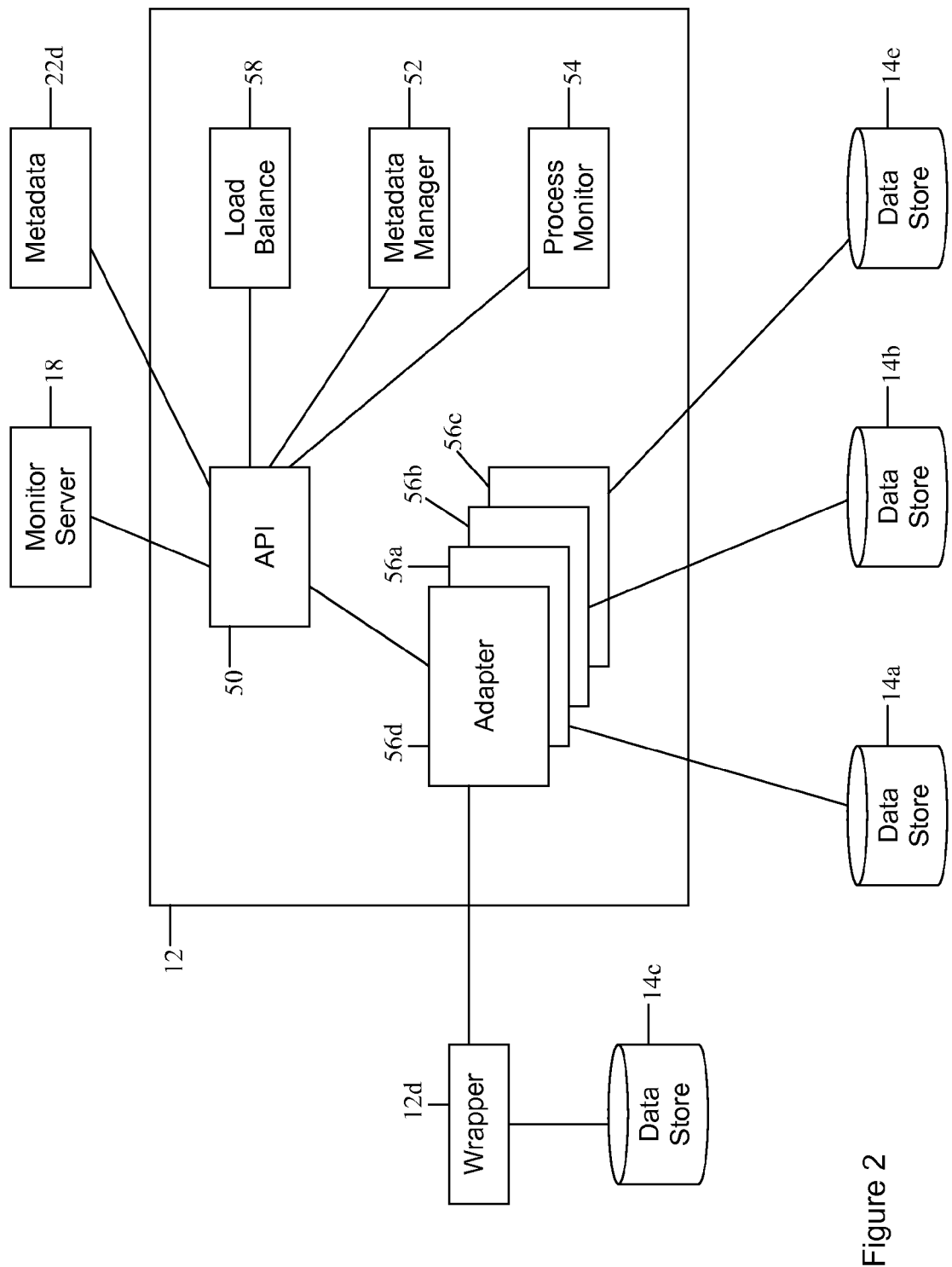
FIG. 2 is a block diagram of a data store wrapper according to an embodiment.

Turning now to FIG. 2, a block diagram of the data store wrapper 12 is depicted. The data store wrapper 12 includes an application programming interface (API) 50, a metadata manager component 52, a process monitor component 54, a plurality of adapters 56—for example, a first adapter 56a, a second adapter 56b, a third adapter 56c, and a fourth adapter 56d—and an optional load balance component 58.

The API 50 provides an interface to the various capabilities and functions of the data store wrapper 12. These functions include reading and writing data to or from the underlying data stores 14 or other data store wrappers 12 and obtaining process monitoring information. The API 50 receives a request for some service provided by the data store wrapper 12, forwards the request for service to an appropriate component or element of the data store wrapper 12, for example the first adapter 56a, and returns the response. The API 50 may select the adapter 56 based on the type of the data store 14 referenced in the request for data store service or based on an address or reference to the data store 14 in the request for data store service. In some cases, the API 50 may act in the capacity of a mediator, interacting with several data store wrapper 12 elements before returning a complete response. In an embodiment the API 50 is composed of an interface component (not shown) and a manager component (not shown).

The adapters 56, which may be plug-ins, provide functionality to communicate with specific data stores 14 or to another data store wrapper 12. Adapters 56 may be provided for common data store systems including Oracle, IBM DB2, Teradata, and others. The first adapter 56a may be implemented to communicate with an Oracle data store 14, for example the first data store 14a. The second adapter 56b may be implemented to communicate with an IBM DB2 data store 14, for example the second data store 14b. The third adapter 56c may be implemented to communicate with a Teradata data store 14, for example a fifth data store 14e. The fourth adapter 56d may be implemented to communicate with another data store wrapper 12. Other adapters 56 may be implemented to communicate with other specific data store applications. When a request for data stored, for example, in an IBM DB2 data store system located on the first data store 14a is received, the API 50 routes the request to the second data store adapter 56b which may be dedicated to communications with the IBM DB2 data stores 14a. The adapters 56 are designed to accommodate any special requirements of accessing data from the data store 14.

The metadata manager 52 provides support for interactions with the metadata repository 22d. For example, the metadata manager 52 may analyze metadata requested from the first data store 14a to select and format information to provide to the metadata repository 22d. On initialization of the data store wrapper 12, for example, the metadata manager 52 may make general queries for metadata to all of the data stores 14 with which the data store wrapper 12 communicates, via the adapters 56. The metadata manager 52 may then select and/or reformat this information. The metadata manager 52 may then send this information to the metadata repository 22d via the API 50. Alternately, the metadata manage 52 may communicate directly with the metadata repository 22d.

The process monitor 54 keeps track of data store service requests received by the data store wrapper 12. When a data store request is received, the process monitor 54 may associate a reference to the data store request and may store information about the state of the data store request, for example the processing time being spent on the data store request, the specific data store request and any associated arguments, the adapter 56 to which the data store request was forwarded and the specific command sent down by the adapter 56 to the data store 14. The process monitor 54 can provide processing reports responding to requests for information from the monitor server 18.

If a processing error occurs in handling the data store service request and an exception message is generated, the API 50 may request the process monitor 54 to provide information to be stored in the exception message which the API 50 propagates upwards. The API 50 communicates this information to the originator of the data store service request sent to the data store wrapper 12, for example the command sent down by the adapter 56. Every data store wrapper 12 involved in carrying out a data store service request adds information, which may be termed appending information, to the exception. The API 50 also appends information identifying the data store wrapper 12. In this way, when an exception has propagated all the way back to the client application 16 a full path back to the source of the exception can be recreated along with the commands and arguments provided in each message involved in the data services request.

The fifth data store wrapper 12e which performs load balancing may categorize exceptions according to severity levels—for example a first severity level, a second severity level, and a third severity level—and may provide different notifications based on the exception severity. For example, first level exceptions may cause the fifth data store wrapper 12e to generate and to send out a page message to personnel responsible for maintaining the data store system 10. For example, second level exceptions may cause the fifth data store wrapper 12e to generate and to send out an email notification to personnel responsible for maintaining the data store system 10.

The process monitor 54 also provides the capability to kill or terminate processing threads within the data store wrapper 12. The processing threads may be associated with a specific data store service request or with a group of related data store service requests, such as all of the data store service requests associated with a specific data store, for example the second data store 14b. The monitor server 18 may provide an interface to the monitor client 20 for killing processing threads. The monitor server 18 may coordinate with multiple data store wrappers 12, as needed, to terminate in an effective manner the processing thread which may be distributed across multiple data store wrappers 12.

The load balance component 58 provides a reference or address of the data store wrapper 12 to which to forward a data store service request. The load balance component 58 may select the data store wrapper 12 based on a round robin selection algorithm. In a round robin selection algorithm, several candidates are eligible to be assigned a task, for example retrieving specific requested data from one of the data stores 14, and each of the candidates, for example the data store wrappers 12, are assigned the task in a rotation order. In an embodiment, the load balance component 58 may monitor the processing load of the data store wrappers 12, for example through requests for information sent to the monitor server 18, and select the data store wrapper 12 based on which data store wrapper 12 is least busy. The particular data store service request may be associated with a cluster of servers supporting data store wrappers 12 having shared access to the data store 14, and the selection algorithm may be applied to the data store wrappers 12 supported by the cluster of servers.

In some embodiments, all data store wrappers 12 contain the load balance component 58. In this embodiment, the data store wrapper 12 is initialized to either employ the load balance component 58 or not to employ the load balance component 58. The data store wrapper 12 may, for example, read a flag set in a configuration file on initialization to discriminate if the load balance component 58 is active or inactive. Alternately, data store wrappers 12 may exist in two variants—a load balancing data store wrapper 12 and a non-load balancing data store wrapper 12. In an embodiment, only one data store wrapper 12 may be enabled to perform the load balancing functionality.

The data store wrapper 12 may monitor and maintain log files on the general purpose computer system. Maintaining log files may include deleting log files which exceed a threshold age. In an embodiment, the data store wrapper 12 may copy the log files to be deleted to a storage system before deleting the log files. The age threshold and copying parameters may be configured by a user interface, such as the monitor client 20 in communication with the monitor server 18.

Figure 3:
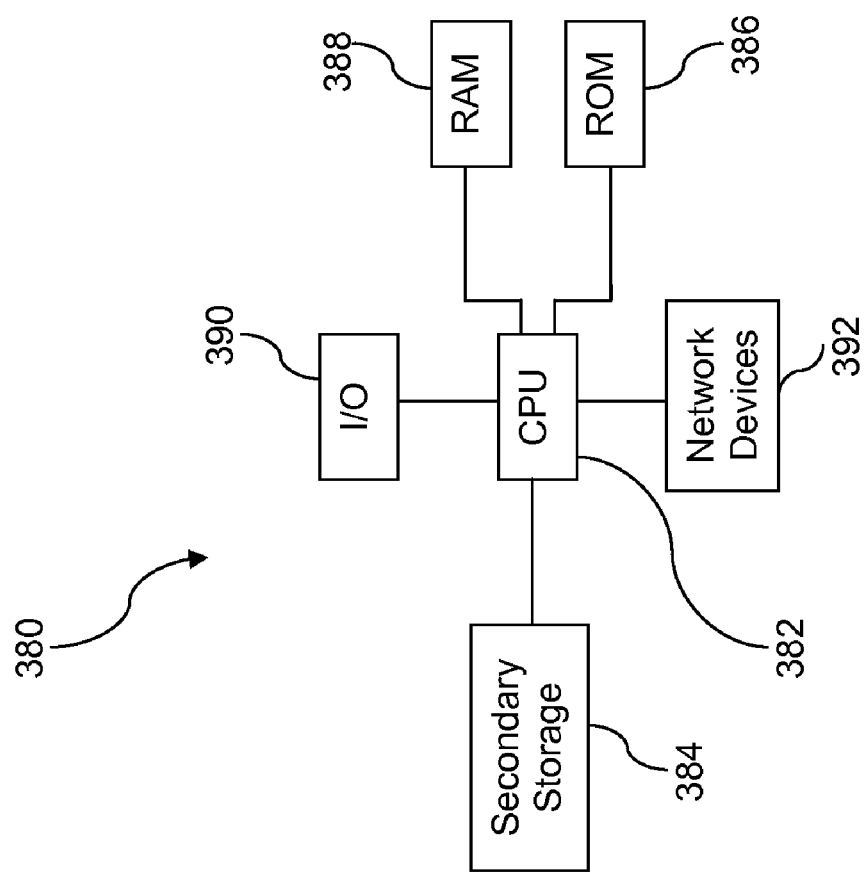
FIG. 3 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, which may be referred to herein as transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A data store wrapper system, comprising:
a plurality of data store wrappers, stored on a computer readable storage media and executable on a data processing system having a processor and memory, each data store wrapper having:
a plurality of adapters configured to send a request for data services to a data store and data store wrappers associated with other data stores, the plurality of adapters further configured to receive a data services response, wherein at least one of the plurality of adapters is configured to communicate the request for data services between two of the plurality of data store wrappers,
an application programming interface configured to communicate with a client application regarding requests for data services, the application programming interface further configured to direct the request for data store services to one of the adapters and to return the data store services response to the client application; and
a load balancer, stored on a computer readable storage media and executable on a data processing system having a processor and memory, having:
a load balance component configured to identify one of the plurality of data store wrappers to which to send the request for data services,
load balance adapters configured to communicate with one or more of the plurality of the data store wrapper regarding requests for data services, and
a load balance application programming interface in communication with the load balance component and configured to receive the request for data services from one or more client applications and further to communicate with one or more of the plurality of data store wrapper regarding requests for data services from the one or more client applications;
and
a monitor, stored on a computer readable storage media and executable on a data processing system having a processor and memory, configured to analyze the state of processing of the data store wrappers and the load balancer and to report a state of processing to a data store wrapper monitor client.

2. The system of claim 1, wherein each of the data store wrappers and the load balancer further comprise a process monitor configured to control and monitor a plurality of threads configured for processing data service requests, and wherein the monitor determines a state of processing by communicating with the process monitor.

3. The system of claim 2, wherein the monitor is further configured to terminate a specific thread of processing of data service requests responsive to a request from the monitor.

4. The system of claim 2, wherein the monitor is further configured to report an amount of processing time being consumed by each of the data store wrappers.

5. The system of claim 2, wherein the monitor is further configured to monitor log files and to manage log files on each of the data store wrappers and the load balancer.

6. The system of claim 2, wherein managing of log files includes deleting log files that exceed a maximum age.

7. The system of claim 6, wherein managing of log files further includes copying the log files to a data storage before deleting the log files.

* * * * *

UNITED STATES PATENT AND TRADEMARK OFFICE
CERTIFICATE OF CORRECTION

PATENT NO. : 7,613,805 B1 Page 1 of 1
APPLICATION NO. : 10/886173
DATED : November 3, 2009
INVENTOR(S) : Katzer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1258 days.

Signed and Sealed this

Nineteenth Day of October, 2010

David J. Kappos
*Director of the United States Patent and Trademark Office*